Patented Nov. 2, 1948

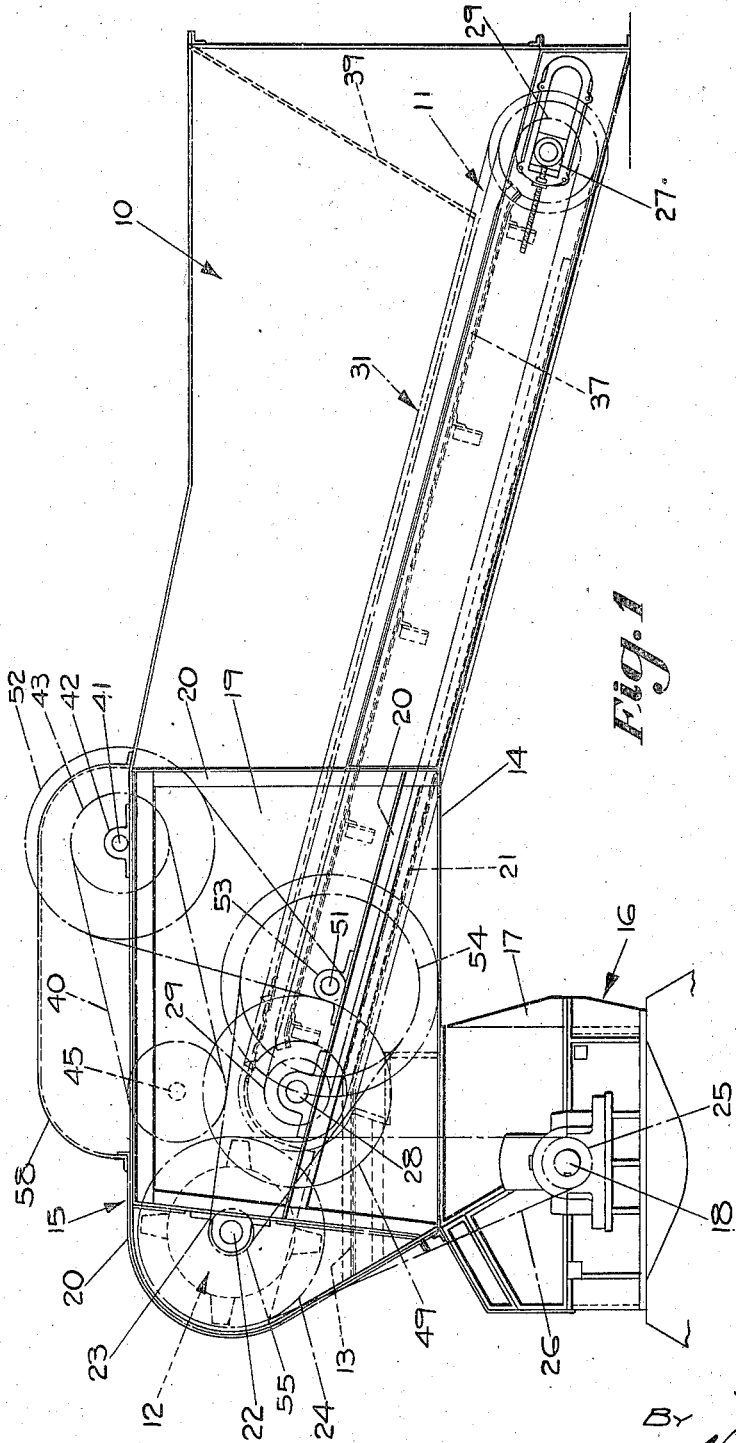

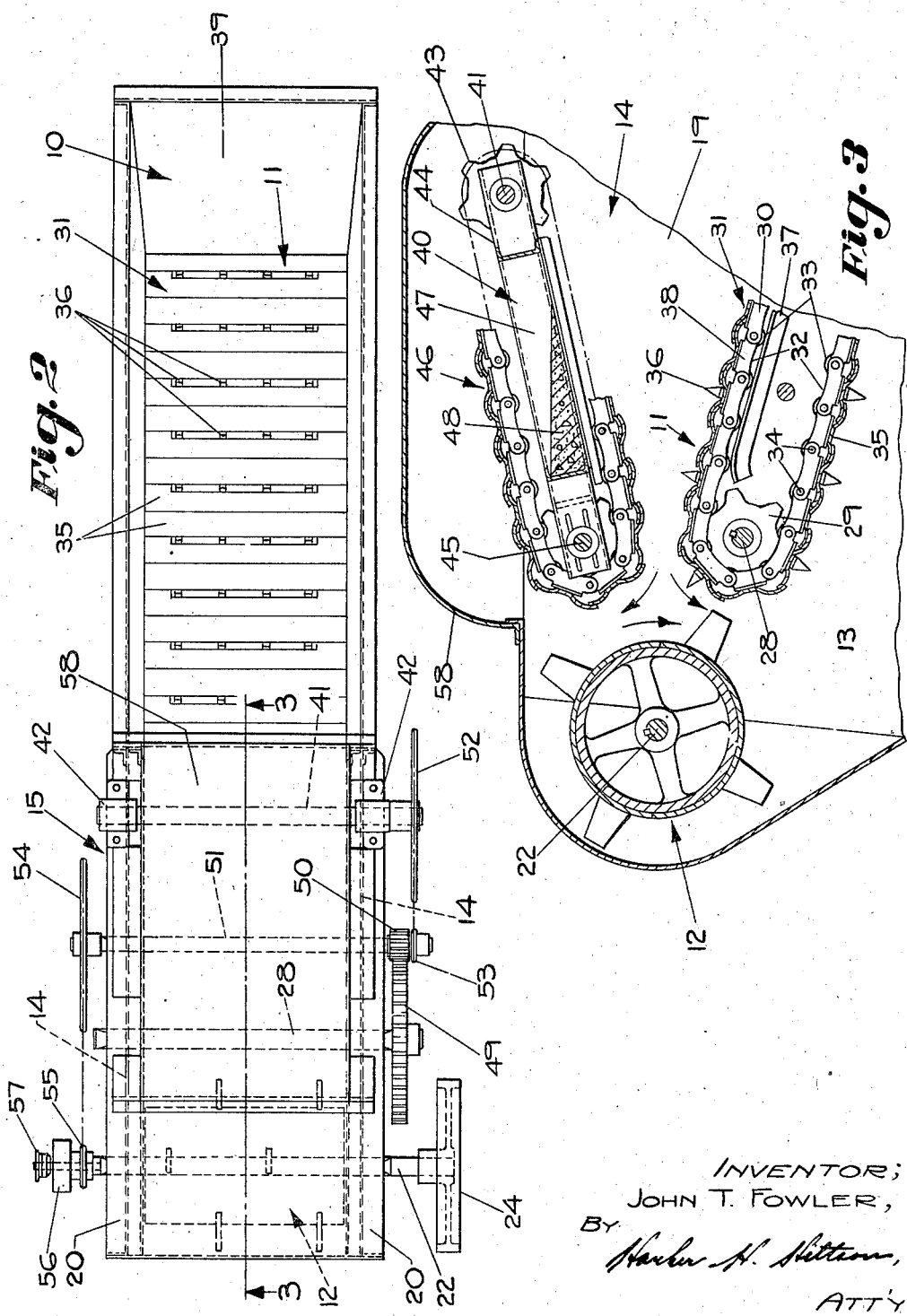

2,453,008

UNITED STATES PATENT OFFICE 2,453,008

MATERIAL REDUCING APPARATUS PARTICULARLY ADAPTED TO REDUCE METAL TURNINGS

John T. Fowler, Columbus, Ohio, assignor to The Jeffrey Manufacturing Company, a corporation of Ohio Application October 14, 1946, Serial No. 703,199

1 Claim. (Cl. 241—152)

My invention relates specifically to apparatus for reducing metal turnings.

The main object of my invention is to provide an improved metal turnings reducing apparatus wherein there is a secondary rotary type grinder and a primary drum type reducer-feeder above the secondary grinder adapted to reduce partially metal turnings and to discharge them in a shredded, broken, combed or torn condition directly to a secondary grinder rotor in the housing of a secondary grinder therebelow for final reduction, the rotor of the secondary grinder driving the primary reducing drum at a reduced or lower speed and the primary reducing drum in turn driving a pair of co-operating conveyors at equal but reduced speeds for conveying the metal turnings and compressing them into a sponge-like mass and while retaining them so compressed slowly extruding them directly radially to the working periphery of the primary metal turnings reducing drum where the metal turnings are shredded, combed, worked, or otherwise partially reduced and prepared and fed downwardly to the secondary grinder rotor at a speed proportional to the speed of the grinding rotor.

Other objects of the invention will appear hereinafter, the novel features and combinations being set forth in the appended claim.

In the accompanying drawings,

Fig. 1 is a side view in elevation of the material reducing apparatus embodying my invention;

Fig. 2 is a plan view of the material reducing apparatus shown in Fig. 1; and

Fig. 3 is a fragmentary sectional view on a larger scale taken through the material reducing feeder apparatus seen in Figs. 1 and 2, the view being taken substantially on line 3—3 of Fig. 2.

Briefly described, the apparatus shown in the drawings includes a feed hopper 10 which receives loose metal turnings to be reduced. In the bottom of the feed hopper 10 there is a conveyer 11 which co-operates with a second conveyer positioned above it to convey and extrude the metal turnings directly to a rotating primary metal turnings reducing drum, roll or shredding element 12 provided with a plurality of radially extending teeth which reduce the material by tearing and shredding it. After being thus worked and reduced, the metal turnings passes downwardly through a discharge opening 13 formed in the bottom of the housing or casing 14 of a primary metal turnings reducing mechanism 15 which includes the primary metal turnings reducing drum, roll or shredding element 12.

The discharge opening 13 of the primary metal turnings reducing mechanism is directly above the feed opening of a secondary metal turnings reducing grinder 16 that includes a casing or housing 17 in which there is mounted a secondary metal turnings reducing rotor carried by a shaft 18 driven by a suitable motor, not shown. The metal turnings are finally ground or pulverized in the grinder 16 and pass through a discharge opening in its bottom to a suitable conveyer or receptacle, not shown.

The casing or housing 17 of the grinder 16 supports the housing or casing 14 of the primary metal turnings reducing mechanism 15 which latter casing or housing 14 includes opposite side frame members formed of wall plates 19 and angle members 20 that reinforce the plates 19 and form supports for bearings, to be described hereinafter. The bottom 21 of the housing or casing 14 merges with the top of the housing or casing 17 of the grinder 16 and extends downwardly therefrom and forms the bottom of the hopper 10 and co-operates with its side walls to form a collector for catching oil or other liquid which may drain from the metal turnings above the conveyer 11.

Extending through the wall plates 19 of the housing or casing 14 is a shaft 22 that is carried adjacent its ends in suitable bearings 23 carried by the angle members 20. Shaft 22 extends through and is keyed to the primary metal turnings reducing drum, roll or shredding element 12 for driving it and one end of the shaft 22 carries a pulley 24 which is in alignment with a drive pulley 25 on the rotor shaft 18 of the grinder 16. A belt 26 connects the pulley 24 and drive pulley 25. It will be seen that when the rotor shaft 18 of the grinder 16 is driven by its motor, the shaft 22 thereabove will be driven at a reduced or lower speed.

Conveyer 11 includes a foot shaft that extends between outer side walls of the feed hopper 10 and this shaft is adjustable rectilinearly by a pair of rack and slide bearing mechanisms 27 carried by said walls and each carries an end of the shaft. Disposed adjacent the periphery of the primary metal turnings reducing drum, roll or shredding element 12 and extending parallel thereto and through the wall plates 19 of the housing or casing 14 is the head or discharge end shaft 28 of the conveyer 11 which is carried by bearings mounted upon the angle members 20. The head or discharge end shaft 28 and the foot shaft of conveyer 11 each has keyed thereto a pair of spaced sprockets 29 over which there operates chains 30 (see Fig. 3) of a belt structure 31. Belt structure 31 includes the spaced chains 30 which are formed of links 32 and rollers 33 which are secured together by cross pins 34. A plurality of plates 35 extend across the spaced chains 30 and co-operate to form a bed structure. Each plate 35 is secured adjacent each of its ends to one of the links of each chain 30 and each plate 35 is curved adjacent its edges to co-operate with its adjacent plates so that as the endless chain belt 31 operates over the sprockets 29 of the head or discharge end shaft 28 and the sprockets of the foot shaft, the surface or bed formed by the co-operating plates 35 will remain completely closed, that is, there will be no openings or spaces formed between the plates into which metal turnings may enter and jam or otherwise damage the belt. Preferably the plates 35 are provided with projecting lugs 36 that are adapted to become embedded in metal turnings being conveyed by the conveyer 11.

The opposite sides of the feed hopper 10 each carries a belt supporting structure in the form of an angle 37 which may be secured to the walls as by welding and over which the rollers 33 of the spaced chains 30 operate to support the upper run 38 of the conveyer 11. The feed hopper 10 includes inner walls 39 which taper downwardly inwardly from the top of the feed hopper. The inner walls 39 properly place or guide metal turnings onto the top of the upper run 38 of conveyer 11.

Conveyer 11 is an endless belt mechanism and it co-operates with a second endless belt mechanism 40 disposed and pivotally mounted above it to form with it a maw that tapers toward the primary reducing drum 12 and in which metal turnings being conveyed are compressed and from which the metal turnings are extruded directly substantially radially to the working periphery of the primary material reducing drum 12. With reference to Figs. 1 and 3 it will be seen that both the upper endless belt mechanism 40 and the lower endless belt conveyer mechanism 11 extend generally radially from the axis of the shaft 22 of the primary metal turnings reducing drum 12. It will be obvious from the description hereinafter that the discharge end of the endless belt mechanism 40 is adjacent the working periphery of the drum 12 and substantially directly above the discharge end of conveyer 11 and is free to move in a generally vertical direction to accommodate and properly compress and hold metal turnings of different solidity or resiliency as they are conveyed and extruded between them.

The upper endless belt mchanism 40 includes a head shaft 41 that extends across the top of the side walls of the housing or casing 14 and is carried by bearings 42 mounted on the angle members 20. Shaft 41 carries a pair of spaced sprockets 43 between which there is pivotally mounted one end of a conveyer frame 44. The other end of the conveyer frame 44 carries a shaft 45 in bearings which are adjustable rectilinearly of the frame 44 for adjusting the tautness of the upper conveyer chain belt 46. The bottom of frame 44 is provided with two shoes upon which the rollers of the conveyer belt ride to maintain the lower run thereof rigid. Shaft 45 is the discharge end shaft of conveyer 40 and like shaft 41 it carries a pair of sprockets over which the chain belt 46 operates. Belt 46 is identical in construction to the belt structure 31 of the lower endless belt conveyer 11 except that it is not provided with projecting lugs 36. Frame 44 includes a pocket 47 in which there is a weight 48 that may be formed of lead, concrete or the like, the purpose of which is to increase the material compressing action of the upper conveyer mechanism.

Head shaft 41 of the endless belt mechanism 40 and shaft 28 of the lower endless belt mechanism are driven from the shaft 22 of the metal turnings reducing or shredding drum 12 in opposite directions at equal speeds through suitable speed reduction mechanism. The speed reduction mechanism includes a large gear 49 secured to the end of shaft 28 which meshes with a pinion gear 50 on one end of a countershaft 51 that extends through the housing or casing 14 and is carried by bearings on the angle members 20. Shaft 41 carries a large sprocket 52 driven through a chain from a pinion sprocket 53 adjacent the pinion gear 50 on countershaft 51. The speed reduction ratio between the pinion gear 50 and gear 49 is the same as the speed reduction ratio between the pinion sprocket 53 and the sprocket 52. The opposite end of countershaft 51 carries a large sprocket 54 which is driven through a chain from a pinion sprocket 55 which is a part of a friction clutch 56 carried upon one end of the material reducing drum shaft 22. Clutch 56 is manually engaged by means of a cone and lever 57. A removable cover 58 encloses a portion of the top of the housing or casing 14 and covers the upper endless belt mechanism 40.

In the operation of the machine loose metal turnings are placed in the hopper 10. The clutch 56 is disengaged and the motor is started which drives the secondary grinder rotor and the primary metal turnings reducing drum 12. When the motor has attained its full speed the clutch 56 is engaged and metal turnings are conveyed slowly to the left from the hopper 10 toward the primary reducing drum 12 by the lower belt conveyer 11. The metal turnings moving toward the reducing drum on the lower conveyer 11 enter the maw formed by and between the upper and lower conveyer members 40 and 11 and is compressed to a relatively solid sponge-like mass by the weight of the upper conveyer 40 and then in effect the metal turnings are extruded by the co-operating upper and lower conveyers directly radially to the working periphery of the rotating metal turnings reducing drum and the metal turnings are retained by the co-operating conveyers in a compressed condition as it is presented to the rotating shredding drum 12 for partial reduction thereby. The drum 12 rotates in such direction that the material is torn, ripped, combed, worked or shredded downwardly by the lugs or teeth of the drum 12 directly over the discharge end of the lower conveyer.

It will be seen that the projecting lugs 36 of the lower conveyer have a dual function, namely, that of preventing slippage between the loose metal turnings being conveyed and that of preventing the free separation or pulling apart of the metal turnings as they are acted upon by the primary reducing drum 12 at the discharge ends of the upper and lower conveyers. It will also be seen that the discharge end of the conveyer 11 constitutes an anvil or surface upon and over which material being reduced, shredded or combed is worked by the drum 12.

From the foregoing description it will be seen that I have provided an improved metal turnings reducing apparatus which is adapted particularly to reduce loose and/or snarled metal turnings of substantially any kind. The upper and lower conveyer mechanisms of the apparatus co-operate to form a conveyer which compresses and extrudes the metal turnings and presents them directly to the primary rotating drum and the conveyer co-operates directly with the drum in reducing, shredding, combing or tearing the material while holding the material in a compressed or relatively solid condition.

The reduction of metal turnings presents a problem different from those encountered for example in the reduction of feed, grain, sugar cane, ensilage and the like because metal turnings tend to snarl into bunches which cannot be successfully unsnarled and reduced by feeders and grinders previously known in the art, since when pulled or combed the entangled strands of metal turnings only tighten the snarl into more compact bunches. My apparatus is successful in reducing metal turnings because the snarled turnings are compressed and while compressed are extruded slowly directly to a material reducing shredding drum that reduces the snarled compressed metal turnings by holding them while a primary reducing element tears, combs, and otherwise reduces them whereupon the partially reduced metal turnings pass or are fed downwardly into the secondary grinder, and these evenly fed unsnarled, broken, or combed metal turnings will not clog the secondary grinder since their rate of feed to the secondary grinder is always proportional to its speed.

Obviously those skilled in the art may make various changes in the details and arrangement of parts without departing from the spirit and scope of the invention as defined by the claim hereto appended and I wish therefore not to be restricted to the precise construction herein disclosed.

Having thus described and shown an embodiment of my invention, what I desire to secure by Letters Patent of the United States is:

A reducing apparatus particularly adapted to reduce metal turnings including a secondary grinder having a housing providing a top feed opening, a power driven shaft having a secondary grinding rotor thereon carried in said housing, a primary reducer including a housing carried by said secondary grinder housing and connected to discharge into the top feed opening of said secondary grinder, a primary metal turnings reducing drum element carried within said primary reducer housing above said secondary grinding rotor and driven at a lower speed from the latter, a hopper, conveyer means forming a tapering maw for conveying and compressing loose metal turnings received from said hopper and extruding them directly substantially radially to the working periphery of said primary metal turnings reducing drum element in a compressed sponge-like condition, said conveyer means including an upper and a lower driven endless belt each having a discharge end disposed closely adjacent the working periphery of said primary metal turnings reducing drum element, said primary metal turnings reducing drum element rotating in a direction to work the metal turnings directly downwardly over the discharge end of said lower endless belt, means pivotally mounting the upper belt for generally vertical movement of its discharge end, and means including a clutch connecting said primary metal turnings reducing drum element and said belts for driving the latter at reduced but equal speeds whereby said metal turnings will be extruded slowly directly and generally radially to the working periphery of said primary metal turnings reducing drum element and held in a compressed sponge-like condition by said belts while said primary metal turnings reducing drum element works and tears the end of said compressed metal turnings directly over the end of the lower belt and feeds the shredded and torn metal turnings downwardly through the top feed opening of said secondary grinder to said secondary grinder rotor at a speed proportional to the speed of the latter.

JOHN T. FOWLER.

REFERENCES CITED

The following references are of record in the file of this patent:

UNITED STATES PATENTS

| Number | Name | Date |
| --- | --- | --- |
| 781,511 | Froehlich | Jan. 31, 1905 |
| 1,271,773 | Richman | July 9, 1918 |
| 1,307,761 | Shelton | June 24, 1919 |
| 1,396,108 | Gilmore | Nov. 8, 1921 |
| 1,449,510 | Holcomb | Mar. 27, 1923 |
| 1,925,618 | Wetmore | Sept. 5, 1933 |
| 2,005,561 | Roscoe | June 18, 1935 |
| 2,150,984 | Nean | Mar. 21, 1939 |

FOREIGN PATENTS

| Number | Country | Date |
| --- | --- | --- |
| 1,925,394 | Holland | Sept. 5, 1933 |
| 2,042,946 | Holland | June 2, 1936 |
| 671,813 | Germany | Feb. 15, 1939 |